May 31, 1966  A. B. HUNTINGTON ETAL  3,253,516
VALVE
Filed Sept. 12, 1963  3 Sheets-Sheet 1

INVENTORS
ANDREW B. HUNTINGTON
DANIEL B. ABBOTT
BY  EDWIN P. BRINKEL

ATTORNEYS

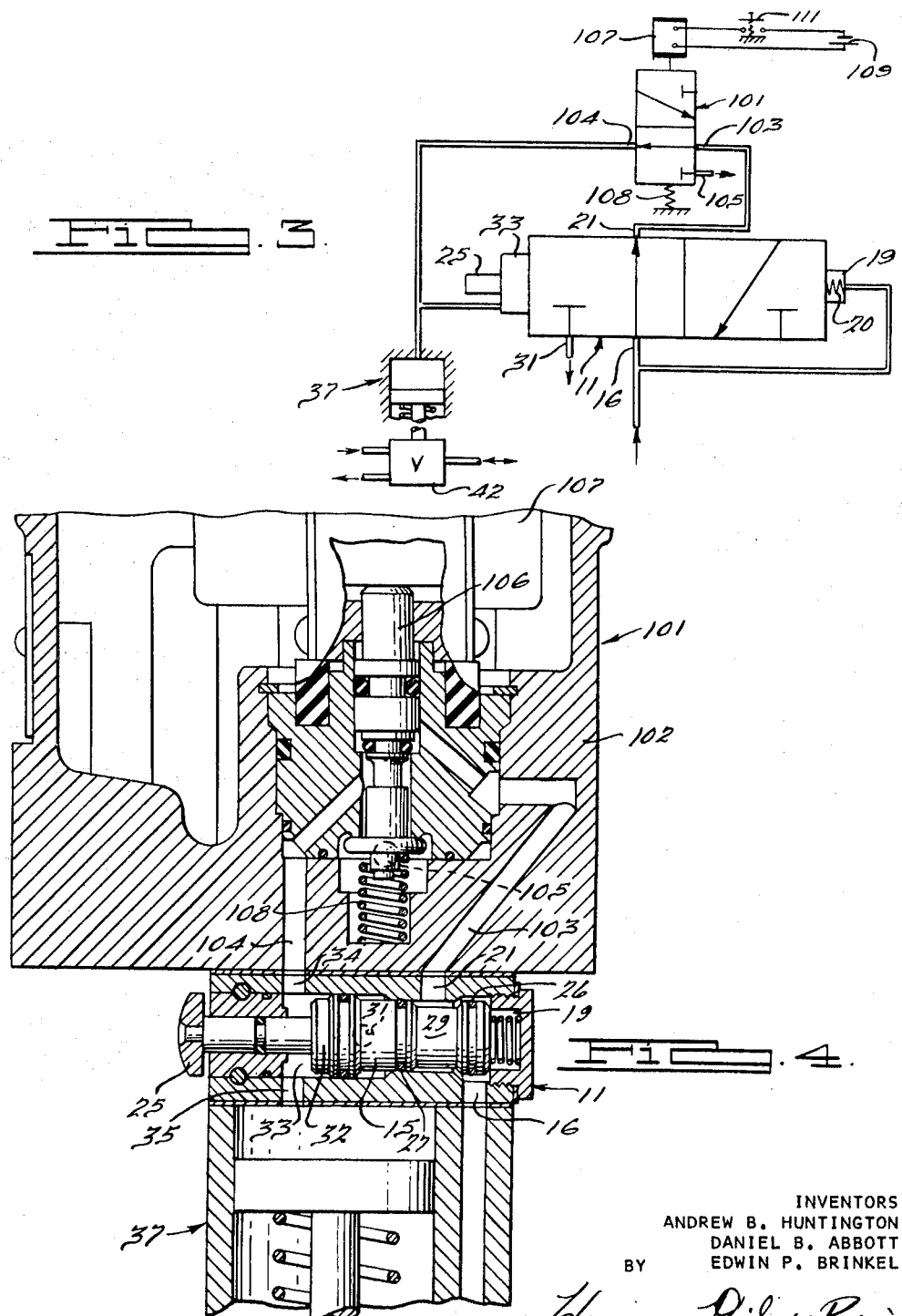

May 31, 1966   A. B. HUNTINGTON ETAL   3,253,516

VALVE

Filed Sept. 12, 1963   3 Sheets-Sheet 3

INVENTORS,
Andrew B. Huntington
Daniel B. Abbott
Edwin P. Brinkel
BY
Barnes, Kisley & Purie
ATTORNEYS

United States Patent Office 3,253,516
Patented May 31, 1966

3,253,516
VALVE
Andrew B. Huntington, Royal Oak, Daniel B. Abbott, Clawson, and Edwin P. Brinkel, Royal Oak, Mich., assignors to Ross Operating Valve Company, Detroit, Mich., a corporation of Michigan
Filed Sept. 12, 1963, Ser. No. 308,546
2 Claims. (Cl. 91—426)

This application is a continuation-in-part of Serial No. 234,432, filed October 31, 1962, now abandoned, and assigned to the assignee of the present application.

This invention relates to valves, and more particularly to devices for preventing the inadvertent reapplication of fluid pressure to a working port after a valve has been shifted to cut off such fluid pressure, or after such fluid pressure has been depleted due to loss at the supply port.

It is an object of the invention to provide a novel and improved lockout valve of this nature which is of simple and rugged construction, is adapted for compact installation together with the valve which it controls, and may be conveniently reset.

It is another object to provide an improved lockout valve of the above character which is usable with both normally closed and normally open control valves, and is especially useful with solenoid-operated valves.

Other objects, features, and advantages of the present invention will become apparent from the subsequent description, taken in conjunction with the accompanying drawings, in which:

FIGURE 3 is a schematic diagram of the lockout valve shown in conjunction with a normally open 3-way solenoid-operated pilot valve, the lockout valve being shown in its open position;

FIGURE 4 is a cross-sectional view in elevation of the lockout valve, pilot valve and motor, with the same relative positions as in FIGURE 3;

Figure 1:
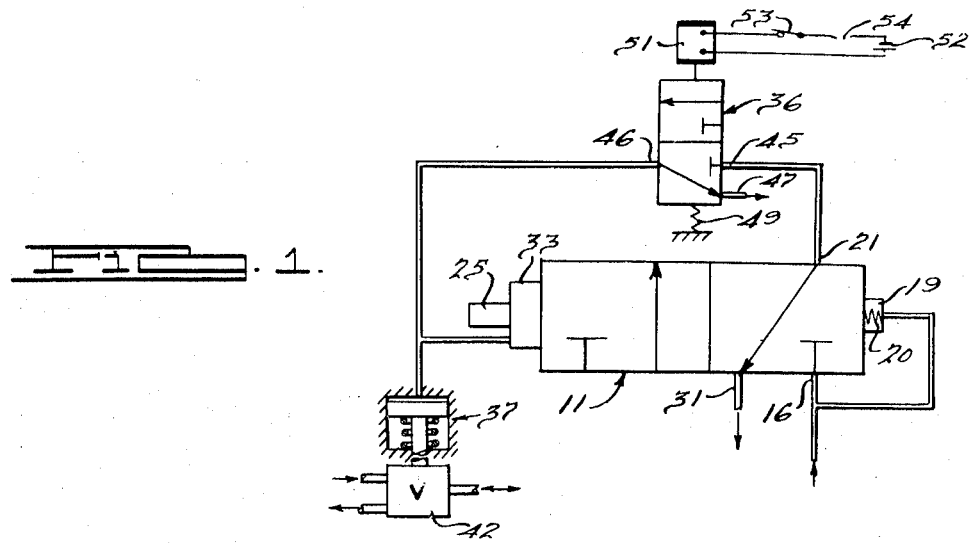
FIGURE 1 is a schematic diagram showing the invention used in conjunction with a 3-way normally closed solenoid-operated pilot valve, the lockout valve being shown in its cutoff position.

Briefly, the illustrated embodiment of the invention comprises a lockout valve having a flat housing with a spool slidably mounted therein, and supply, outlet and exhaust ports. One end of the spool is provided with a compression spring and a relatively small area pressure chamber connected to the supply port, and the other end with a relatively large area pressure chamber and a manual push button.

In one illustrated installation, the outlet port of the lockout valve is connected to the supply port of a normally closed 3-way solenoid-operated control or pilot valve. The outlet port of the pilot valve is connected to a single-acting fluid motor such as is used to operate a main valve, and also to the larger area pressure chamber of the lockout valve. Normally, the solenoid of the pilot valve is energized and the pilot valve is in its open position, maintaining the lockout valve in its open position. Should the pilot valve be shifted to its closed position, for example by current failure, the lockout valve will be shifted to its closed position. Thereafter, upon reapplication of current and shifting of the pilot valve to its open position, no fluid will be supplied to the motor until the lockout valve is manually returned to its open position. If the supply pressure drops or is removed, the lockout valve will be shifted by its spring to the lockout position, and reapplication of supply pressure will not result in resetting of the motor until the lockout valve is manually reset.

In another illustrated installation of the invention, the outlet port of the lockout valve is connected to the supply port of a normally open 3-way solenoid-operated pilot valve. The outlet port of the pilot valve is, as in the previous installation, connected to a single-acting fluid motor and to the larger area pressure chamber of the lockout valve. In this installation, the solenoid of the pilot valve will normally be deenergized with both the pilot and lockout valves in their open position. Momentary energization of the solenoid will close the pilot valve and shift the lockout valve to its closed position. Return of the pilot valve to its open position when the solenoid is deenergized will not result in reapplication of pressure to the motor until the lockout valve is manually returned to its open position. Supply pressure failure will also result in a locked out condition until the lockout valve is manually reset, as in the previous embodiment.

In a third illustrated embodiment of the invention, the outlet port of the lockout valve is connected directly to the motor, and the fluid supply source is connected to the inlet port of a normally closed 3-way solenoid-operated pilot valve. The outlet port of the pilot valve is connected to the signal chamber of the lockout valve. The latter is provided with a spring and pressure differential area construction such that reapplication of pressure to the signal chamber after the lockout valve has moved to its closed position will not cause it to return to its open position until manual pressure is additionally exerted on the lockout valve.

Referring more particularly to the drawings, the lockout valve is generally indicated at 11 and comprises a housing 12 having opposed flat faces 13 and 14, and a spool 15 slidably mounted in housing 12 on an axis parallel to surfaces 13 and 14. Housing 12 has a supply or inlet port 16 leading from surface 14 to a bore section 17 of relatively small diameter. An end cap 18 is threadably mounted in one end of the bore carrying spool 15, this end cap forming a chamber 19 connected to port 16. A helical compression spring 20 is disposed within chamber 19, urging spool 15 to the left. An outlet port 21 extends from bore section 17 to surface 13 of housing 12, port 21 being axially displaced from port 16. A bore section 22 of larger diameter than bore section 17 extends from bore section 17 to the end of housing 12 opposite that which carries end cap 18. An insert 23 is secured within the outer end of bore section 22 and slidably supports a relatively narrow extension 24 of spool 15. Extension 24 extends outward of insert 23 and carries a push button 25.

Figure 2:
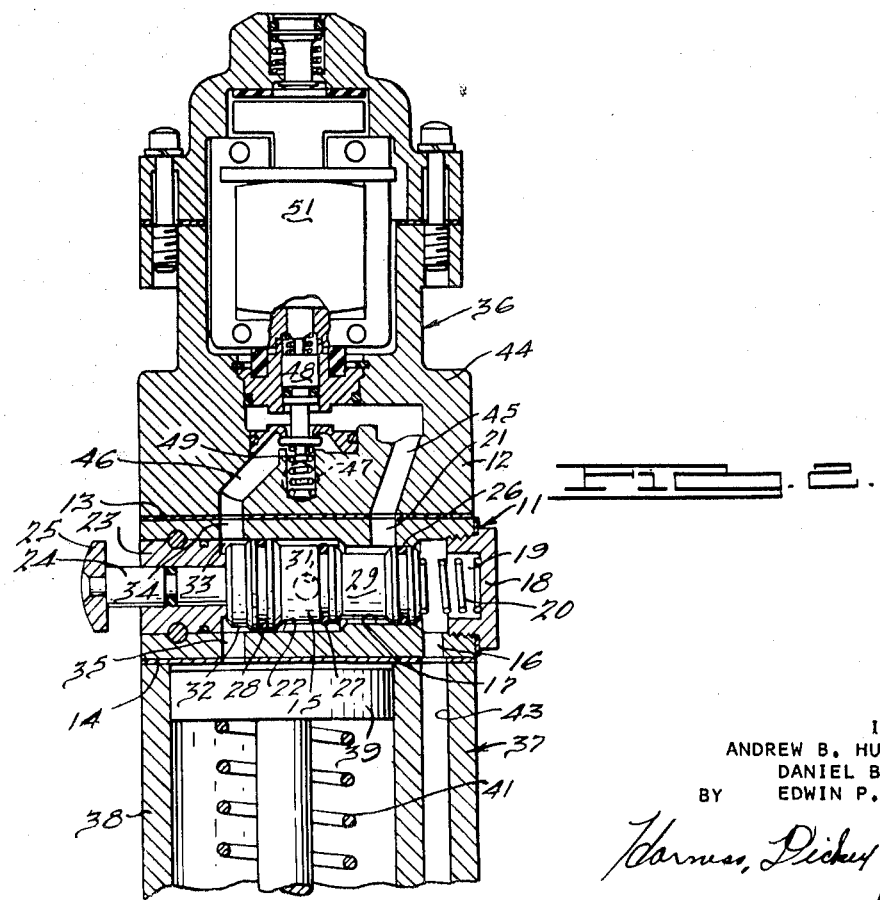
FIGURE 2 is a cross-sectional view in elevation of the lockout valve together with the pilot valve and motor, the parts being shown in the same relative positions as in FIGURE 1.

Spool 15 carries an inlet valve seal 26 at the end adjacent end cap 18, an exhaust valve seal 27 at an intermediate portion, and a seal 28 within bore section 22. In its right-hand or open position as seen in FIGURE 4, seal 26 is disposed within chamber 19, and port 16 is connected to port 21 by a reduced section 29 on spool 15 between seals 26 and 27. An exhaust port 31 extends from bore section 22 through housing 12, and when spool 15 is in its left-hand or lockout position as seen in FIGURE 2, outlet port 21 is connected to exhaust port 31 by virtue of the fact that seal 27 is removed from bore section 17 into bore section 22. When in its lockout position, seal 26 is disposed within bore section 17 between ports 16 and 21, thus cutting off the supply port from the outlet port. The left-hand position of spool 15 is defined by engagement of a shoulder 32 on spool 15 with insert 23. The right-hand position of spool 15 is defined by engagement of its right-hand end with end cap 18.

As indicated previously, the effective area of the chamber 33 between seal 28 and insert 23 is greater than the effective area of chamber 19 by virtue of the fact that seal 28 is of larger diameter than seals 26 and 27. Chamber 33 also serves to connect a port 34 leading from surface 13 of housing 12 to bore section 22 and a port 35 leading from bore section 22 to surface 14 of the housing.

Ports 34 and 35 serve to connect a control or pilot valve and a fluid motor. In the installation shown in FIGURES 1 and 2, the pilot valve is generally indicated at 36 and is mounted on surface 13 of valve 11. The fluid motor is generally indicated at 37 and comprises a cylinder 38 on which surface 14 of valve 11 is mounted, and a piston 39 urged upwardly by a spring 41. Motor 37 may, for example, actuate a valve 42 shown schematically in FIGURE 1. Valve 42 may be a 3-way valve used in a chemical process or the like, which is open during normal operation but which when closed should not be inadvertently reopened lest the process be disturbed. A supply conduit 43 is shown as being formed in cylinder 38 and connected to supply port 16 of valve 11.

Pilot valve 36 is of a solenoid-operated 3-way normally closed type, having a housing 44 with an inlet or supply port 45 connected to port 21, a working or outlet port 46 connected to port 34 and an exhaust port 47. Valve 36 has a valve spool 48 urged to a normally closed position by supply pressure and by a spring 49, spool 48 being movable to an open position by a solenoid 51 supplied by a current source 52 (FIGURE 1) through a switch 53. In its normally closed position, spool 48 connects working port 46 to exhaust port 47 whereas in its open position supply port 45 is connected to working port 46.

In operation of the system shown in FIGURES 1 and 2, it may be assumed switch 53 will normally be closed, so that spool 48 will be in its lower position. It may be further assumed that spool 15 of valve 11 will initially be in its right-hand position. With the parts in these positions, inlet port 16 will be connected to outlet port 21 of valve 11, and pressurized inlet port 45 of valve 36 will be connected to working port 46. Fluid will flow through ports 34 and 35 to motor 37, depressing piston 39. The pressure in chamber 33 (acting on seal 28) will overbalance the force of spring 20 and the pressure in chamber 19 (acting against seal 27), thus holding spool 15 in its right-hand position.

Should solenoid 51 be deenergized, for example, by a break in its circuit indicated schematically at 54, pilot valve 36 will shift to its closed position as shown in FIGURES 1 and 2. This will connect motor 37 and chamber 33 to exhaust port 47. Piston 39 will thus move to its upper position and valve spool 15 to its left-hand position as seen in FIGURES 1 and 2. Upon repair of break 54, reenergization of solenoid 51 will again shift valve spool 48 downwardly. However, since port 16 is cut off from port 21, there will be no pressure to move piston 39 downwardly or to move valve spool 15 to the right. Valve 42 will thus remain in the position to which it was shifted when break 54 occurred. To return valve 36 to service, push button 25 will be depressed, shifting valve 15 to the right and reconnecting ports 16 and 21. Since ports 45 and 46 are connected, pressure will be applied to motor 37 and to chamber 33, shifting piston 39 downwardly and holding valve spool 15 in its right-hand or open position.

Should pressure be depleted at supply port 16, for example due to a service disruption, motor 37 will move upwardly, and valve spool 15 will move to its left-hand or lockout position under the influence of spring 20. Resumption of line pressure will not result in downward movement of motor 37 until (assuming that pilot valve 36 remains in its open position) valve spool 15 is manually shifted to its open position.

FIGURES 3 and 4 illustrate another installation of valve 11 in which it controls a 3-way normally open solenoid-operated pilot valve 101 controlling a motor 37. Valve 101 has a housing 102 with an inlet port 103 connected to port 21, a working port 104 connected to port 34 and an exhaust port 105. A spool 106 within housing 102 is operable by a solenoid 107 to a lower position in which port 104 is conected to port 105 and is returnable by a spring 108 to an open position in which port 103 is connected to port 104. Solenoid 107 is energized from a power source 109 through a circuit having a normally open push button 111.

In operation of the system of FIGURES 3 and 4, it may be assumed that push button 111 will normally be open with the valves occupying the positions shown in FIGURES 3 and 4. That is, valve 11 will be in its right-hand position, applying pressure to inlet port 103 of pivot valve 101, the pilot valve in turn supplying pressure to fluid motor 37 and to chamber 33, holding valve 11 in its open position. The purpose of push button 111 may be for remote shifting of valve 42, so that by momentary depression of push button 111, motor 37 will be exhausted through ports 104 and 105 of pilot valve 101. This results from downward shifting of pilot valve 101 from the position shown in FIGURES 3 and 4, and upon release of pressure from chamber 33, the pressure in chamber 19 will shift valve 11 to its left-hand or lockout position.

Upon release of push button 111, solenoid 107 will be deenergized and valve spool 106 will shift upwardly to the position shown in FIGURES 3 and 4. However, no fluid pressure will be supplied to chamber 33 or motor 37 since port 16 is disconnected from port 21. Valve 42 will thus remain in its shifted position until manual return of valve spool 15 to its right-hand position as shown in FIGURES 3 and 4 by push button 25.

As in the previous embodiment, loss of pressure at supply port 16 will result in locking out of pilot valve 101 due to the action of spring 20 which will shift valve spool 15 to the left. Restoration of supply pressure will not reshift motor 37 until valve spool 15 has been manually reset.

Figure 5:
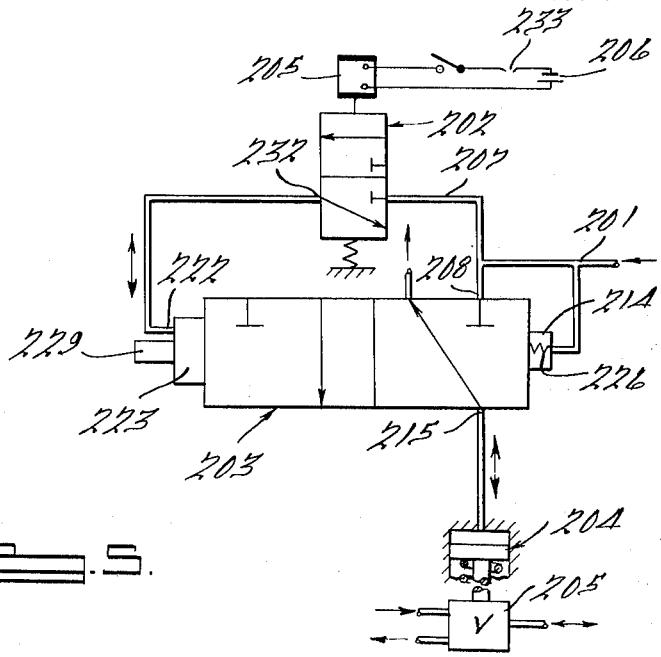
FIGURE 5 is a schematic diagram of a modified arrangement in which the pilot valve is not in the fluid flow path to the motor.
Figure 6:
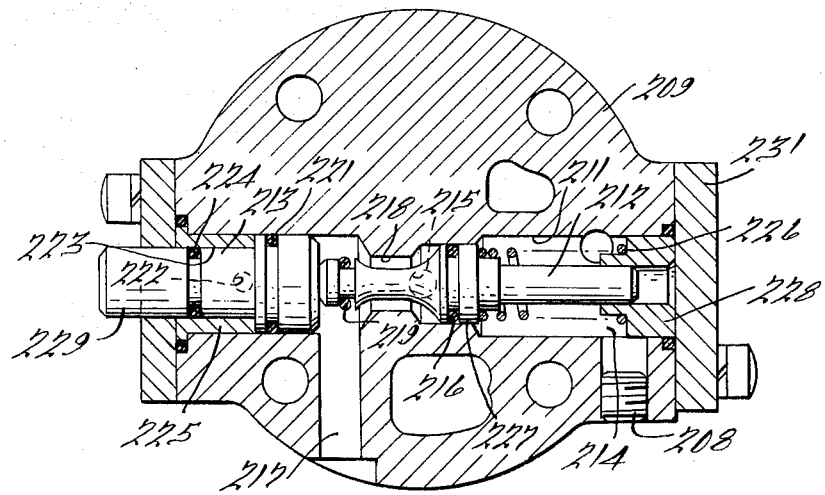
FIGURE 6 is a cross-sectional view of the lockout valve used in the FIGURE 5 arrangement.

FIGURES 5 and 6 illustrate a third embodiment of the invention in which a supply port 201 is provided together with a pilot or control valve generally indicated at 202, a lockout valve generally indicated at 203, and a motor generally indicated at 204 for a valve 205. Pilot valve 202 is a normally closed 3-way solenoid operated valve, and its position is controlled by a solenoid 205 having a current source 206. Supply port 201 is connected to inlet port 207 of valve 202 and to inlet port 208 of valve 203.

The construction of valve 203 is seen in FIGURE 6, the valve having a housing 209 with a stepped bore 211 and a pair of spools 212 and 213 slidably mounted in the bore. Inlet bore 208 is connected to an inlet chamber 214 at the right hand end of bore 211, and a working or outlet port 215 is connected to an intermediate portion of bore 211 of somewhat smaller diameter than that forming chamber 214. A seal 216 carried by spool 212 is slidably disposed in the portion of bore 211 adjacent port 215 when spool 212 is in its left hand position as shown in FIGURE 6, but is disposed in chamber 214 when the spool moves to its right hand position.

An exhaust port 217 is provided in housing 209 leading from the left hand portion of bore 211, and a bore portion 218 of narrower diameter than that immediately to the right of it is disposed between ports 215 and 217. A seal 219 is carried by the left hand end of spool 212 and is slidable within bore portion 218 when spool 212 moves to its right hand position; the effective pressure area created by seal 219 is less than that of seal 216.

Spool 213 carries a seal 221 with a larger effective area than that of seal 216. Seal 221 is disposed between port 217 and a signal port 222 leading to a signal chamber 223. A seal 224 is carried by spool 213 to the left of port 222, this seal being considerably smaller in effective area than seal 221 and being slidable within a bushing 225. Seals 221 and 224 thus form the opposite ends of signal chamber 223, and the difference between their effective areas tends to urge spool 213 to the right, this spool being in abutting relation with spool 212.

A helical coil compression spring 226 is disposed between a shoulder 227 on spool 212 immediately to the right of seal 216 and a shoulder on a bushing 228 mounted in the right hand end of bore 211. The strength of spring 226 is such that when supply pressure is applied to both ports 208 and 222 at the same time, and the spools are initially in their left hand position as shown, the difference in areas between seals 221 and 224 will be insufficient to counteract the force on the area created by seal 216 plus the force of spring 226. A push button 229 is provided on the left hand end of spool 213, and when this button is pushed to the right, it will move the spools to their right hand position, as defined by the engagement of spool 212 with a cover plate 231. As fluid pressure passes around seal 216 (which may be termed the inlet valve member of lockout valve 203), pressure will no longer act on seal area 216 but only on smaller seal area 219 (which may be termed the exhaust valve member) which has entered bore portion 218. The differential area between seals 224 and 221 will create sufficient force to counteract that exerted on seal 219 plus the force of spring 226, so that when push button 229 is released, the lockout valve will stay in its right hand or open position as long as pressure is applied to port 222. Removal of pressure at signal port 222 will cause lockout valve 203 to immediately move to its left hand or closed position, connecting outlet port 215 with exhaust port 217. This will again cause the area of seal 216 to become effective, preventing resetting of the lockout valve unless it is manually returned for the reasons given above.

Outlet port 215 of the lockout valve is connected directly to motor 204, and outlet port 232 of pilot valve 202 is connected to chamber 223, seen in FIGURE 5.

In operation of the embodiment of FIGURES 5 and 6, when solenoid 205 is energized, pilot valve 202 will be in its open position, applying pressure to signal chamber 223, and when push button 229 is pressed, lockout valve 203 will move to and remain in its open position and will supply fluid pressure to motor 204.

Should a break 233 occur in the circuit supplying the current to solenoid 205, pilot valve 202 will move to its closed or exhaust position. This will exhaust pressure from signal chamber 223, causing lockout valve 203 to move to its left hand or closed position, exhausting pressure from motor 204. When the break is repaired and solenoid 205 is reenergized, movement of pilot valve 202 to its open position will repressurize signal chamber 223. However, since the effective area differential between seals 221 and 224 is insufficient to overcome the effective area of seal 216 plus the force of spring 226, the lockout valve 203 will remain in its closed position until push button 229 is again pressed. When it is pressed, seal 219 will become effective instead of seal 216, and the pressure in chamber 223 will be sufficient to hold the valve in its open position, resupplying fluid pressure to motor 204.

Should a drop in pressure at supply port 201 occur, the effect will be similar, depletion of pressure in chamber 223 causing lockout valve 203 to move to its exhaust position. Reapplication of pressure at supply port 201 will not result in resetting of lockout valve 203 until it is manually reset. It will be apparent, especially when considering the embodiment of FIGURES 1 and 3, that the embodiment of FIGURES 5 and 6 could be modified by having a normally open 3-way solenoid operated pilot valve instead of the normally closed pilot valve shown.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a system for controlling the flow of fluid to a fluid motor, a fluid supply port, a lockout valve having an inlet port connected to said supply port, an outlet port connected to said fluid motor and an exhaust port, said lockout valve being movable between an open position in which said inlet and outlet ports are connected and a closed position in which said outlet and exhaust ports are connected, a first pressure area on said lockout valve connected to said supply port and effective when the lockout valve is in its closed position to maintain the lockout valve in said closed position, said first pressure area being ineffective when the lockout valve is in its open position; a second pressure area smaller than said first pressure area and connected to said supply port so as to be effective when the lockout valve is in its open position to urge the lockout valve to its closed position but ineffective when the lockout valve is in its closed position, a spring urging said lockout valve to its closed position, a signal chamber having a third pressure area urging the lockout valve to its open position, said third area being insufficient to overcome said first pressure area and said spring and move the lockout valve to its open position but being sufficient to counteract said second pressure area and spring and hold the lockout valve in its open position; means for manually moving said lockout valve to its open position, and a control valve having inlet, outlet and exhaust ports, said inlet port being connected to said supply port and said outlet port being connected to said signal chamber.

2. In a system for controlling the flow of fluid to a fluid motor, a fluid supply port, a lockout valve having an inlet port connected to said supply port, an outlet port connected to said fluid motor and an exhaust port, said lockout valve being movable between an open position in which said inlet and outlet ports are connected and a closed position in which said outlet and exhaust ports are connected, a first pressure area on said lockout valve connected to said supply port and effective when the lockout valve is in its closed position to maintain the lockout valve in said closed position, said first pressure area being ineffective when the lockout valve is in its open position; a second pressure area smaller than said first pressure area and connected to said supply port so as to be effective when the lockout valve is in its open position to urge the lockout valve to its closed position but ineffective when the lockout valve is in its closed position, a signal chamber having a third pressure area urging the lockout valve to its open position, said third area being insufficient to overcome said first pressure area and move the lockout valve to its open position but being sufficient to counteract said second pressure area and hold the lockout valve in its open position; means for manually moving said lockout valve to its open position, and a control valve having inlet, outlet and exhaust ports, said inlet port being connected to said supply port and said outlet port being connected to said signal chamber.

References Cited by the Examiner

UNITED STATES PATENTS 2,900,960  8/1959  Gratzmuller _____ 91—426

SAMUEL LEVINE, *Primary Examiner.*

FRED E. ENGELTHALER, *Examiner.*

P. T. COBRIN, *Assistant Examiner.*